United States Patent [19]
Shimoda

[11] Patent Number: 5,835,466
[45] Date of Patent: Nov. 10, 1998

[54] OPTICAL SYSTEM FOR OPTICAL DISC HAVING FIRST AND SECOND INFORMATION

[75] Inventor: Yasuhisa Shimoda, Saitama-ken, Japan

[73] Assignee: Pioneer Electronic Corporation, Tokyo, Japan

[21] Appl. No.: 752,935

[22] Filed: Nov. 20, 1996

[30] Foreign Application Priority Data

Nov. 22, 1995 [JP] Japan .................................. 7-328303

[51] Int. Cl.$^6$ ........................................................ G11B 7/00
[52] U.S. Cl. .......................... 369/54; 369/58; 369/44.23; 369/44.29
[58] Field of Search ..................... 369/100, 109, 369/54, 58, 44.13, 44.37, 44.38, 44.26, 94, 44.23, 44.29, 44.35, 44.27

[56] References Cited

U.S. PATENT DOCUMENTS

| | | | |
|---|---|---|---|
| 5,132,953 | 7/1992 | Matsubayshi | 369/44.37 |
| 5,297,114 | 3/1994 | Itoh et al. | 369/44.35 |
| 5,361,244 | 11/1994 | Nakamura et al. | 369/44.26 |

FOREIGN PATENT DOCUMENTS

| | | | |
|---|---|---|---|
| 0 558 052 | 2/1992 | European Pat. Off. | |
| 43 08 531 | 9/1994 | Germany | |
| 0223944 | 12/1984 | Japan | 369/44.23 |
| 405028520 | 2/1993 | Japan | 369/44.23 |

OTHER PUBLICATIONS

Patent Abstract of Japan No. 06 052 549, vol. 18, No. 293, Jun. 3, 1994.
Patent Abstract of Japan No. 7 244 919, vol. 096. No. 001, Jan. 31, 1996.
Patent Abstract of Japan No. 6 215 411, vol. 18, No. 587, Nov. 10, 1994.

*Primary Examiner*—Thang V. Tran
*Attorney, Agent, or Firm*—Nikaido Marmelstein Murray & Oram, LLP

[57] ABSTRACT

There is provided an optical pickup controlling system for an optical disc player. The optical disc player is adapted to direct a laser beam on to an optical disc which contains a first information recorded thereon in terms of information pits formed on information tracks and a second information recorded thereon in terms of shapes of information tracks. Here, the laser beam may have a first beam spot or a second beam spot, the second beam spot is for reproducing the second information, the second beam spot is narrower in a direction orthogonal to the information track direction than the first beam spot which is for reproducing or recording the first information. In detail, the first beam spot is in an elliptical shape having its shorter axis arranged in the information track direction, the second beam spot is in another elliptical shape having its shorter axis arranged in a direction orthogonal to the information track direction.

9 Claims, 2 Drawing Sheets

OPTICAL SYSTEM FOR OPTICAL DISC HAVING FIRST AND SECOND INFORMATION

BACKGROUND OF THE INVENTION

The present invention relates to an optical pickup controlling system, in particular to an optical pickup controlling system for controlling focusing movement of an optical pickup which is used in an optical disc player.

FIG. 3 is a block diagram showing a conventional optical pickup controlling system for controlling focusing movement of an optical pickup in an optical disc player. In the conventional system shown in FIG. 3, an optical disc 1 is rotationally driven by a motor 2, so that information recorded on an information recording layer of the disc 1 may be read out by an optical pickup 3.

Similar to a conventional disc player but not shown in the drawing, the optical pickup 3 includes a laser beam source, an objective lens, an actuator, etc. The actuator is provided to drive the objective lens so that the objective lens can properly focus a laser beam emitting from the laser beam source on to an information recording layer of the optical disc 1. In fact, a laser beam spot is formed on the information recording layer so as to read out the information recorded thereon.

In the system shown in FIG. 3, if there is a focus error during an information reproducing process, a focus error signal will be generated and fed from the pickup 3 through a current/voltage converter amplifier 4 to a focus error amplifier 5. An output signal from the focus error amplifier 5 is further amplified in a focus servo amplifier 6. An amplified focus servo signal is then fed to the focusing driver 7 which is provided to drive a focus actuator coil (not shown) of the optical pickup 3 to perform a desired focus control. In this manner, a focus servo loop is formed so that a normal focus control may be carried out.

If an optical disc is a CD-R disc (called CD-Recorder that is a recordable disc), such a disc has many guide grooves called pregroove. When information is to be recorded, information pits are formed in the pregrooves by irradiating the pregrooves with a strong laser beam modulated in accordance with the actual information to be recorded.

The pregrooves usually involve a waviness having a substantially constant frequency, which is called wobble signals. The wobble signals are used to control the turning of an optical disc when recording information in an un-recorded area on the disc. Moreover, the wobble signals are FM-modulated in order to obtain information such as absolute time data of an optical disc.

However, when an optical disc is a CD-R disc, since signals from information pits and wobble signals are two different kinds of signals, the conventional optical pickup controlling system shown in FIG. 3 has been proved difficult to ensure a satisfactory information reproduction.

SUMMARY OF THE INVENTION

An object of the present invention is to provide an improved focus controlling system so as to solve the above-mentioned problem peculiar to the above-mentioned prior art.

According to one aspect of the present invention, there is provided an improved optical pickup controlling system for an optical disc player. Said optical disc player is adapted to direct a laser beam on to an optical disc which contains a first information recorded thereon in terms of information pits formed on information tracks and a second information recorded thereon in terms of shapes of information tracks. Here, the laser beam may have a first beam spot or a second beam spot, the second beam spot is for reproducing the second information, said second beam spot is narrower in a direction orthogonal to information track direction than the first beam spot which is for reproducing or recording the first information. In detail, the first beam spot is in an elliptical shape having its shorter axis arranged in information track direction, the second beam spot is in another elliptical shape having its shorter axis arranged in a direction orthogonal to information track direction.

According to another aspect of the present invention, there is provided another improved optical pickup controlling system for an optical disc player. Said optical disc player is adapted to direct a laser beam on to a first optical disc which contains information recorded thereon in terms of information pits formed on information tracks, or a second optical disc which contains information recorded thereon in terms of shapes of information tracks. Similarly, the laser beam may have a first beam spot or a second beam spot, the second beam spot is for recording or reproducing the second optical disc, said second beam spot is narrower in a direction orthogonal to information track direction than the first beam spot which is for reproducing the first optical disc. Also, the first beam spot is in an elliptical shape having its shorter axis arranged in information track direction, the second beam spot is in another elliptical shape having its shorter axis arranged in a direction orthogonal to information track direction.

Specifically, the optical pickup controlling system according to the present invention, comprises: a focus error signal generator for producing a focus error signal; a first focus offset signal generator for producing a first focus offset signal; a second focus offset signal generator for producing a second focus offset signal; a controller for selectively adding the first focus offset signal or the second focus offset signal to the focus error signal. In detail, the first focus offset signal is added to the focus error signal to obtain a laser beam having the above-mentioned first beam spot, whilst the second focus offset signal is added to the focus error signal to obtain a laser beam having the above-mentioned second beam spot.

In particular, an optical pickup controlling system according to the present invention, comprises: a focus error signal generator for producing a focus error signal; a first focus offset signal generator for producing a first focus offset signal; a second focus offset signal generator for producing a second focus offset signal; a disc type discriminating means for determining a disc to be played is a first optical disc or a second optical disc; a controller for adding the first focus offset signal to the focus error signal when an optical disc to be played is the first optical disc, and for adding the second offset signal to the focus error signal when an optical disc to be played is the second optical disc. Similarly, the first focus offset signal is added to the focus error signal to obtain a laser beam having the above-mentioned first beam spot, whilst the second focus offset signal is added to the focus error signal to obtain a laser beam having the above-mentioned second beam spot.

The above objects and features of the present invention will become more understood from the following description with reference to the accompanying drawings.

DETAILED DESCRIPTION OF THE PREFERRED EMBODIMENTS

Figure 1:
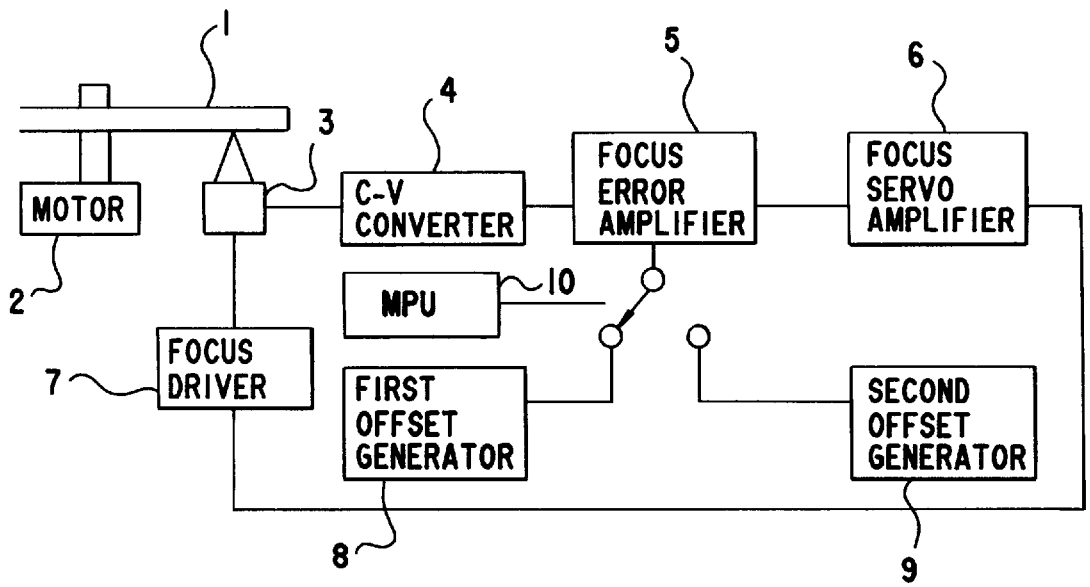
FIG. 1 is a block diagram showing an optical pickup controlling system according to the present invention.

FIG. 1 shows an optical pickup controlling system for controlling focusing movement of an optical pickup which is used in an optical disc player. In FIG. 1, an optical disc 1 is rotationally driven by a motor 2, so that information recorded on an information recording layer of the disc 1 may be read out by an optical pickup 3.

Similar to a conventional disc player but not shown in the drawing, the optical pickup 3 includes a laser beam source, an objective lens, an actuator, etc. The actuator is provided to drive the objective lens so that the objective lens can properly focus a laser beam emitting from the laser beam source onto the information recording layer of the optical disc 1. In fact, a laser beam spot is formed on the information recording layer so as to read out the information recorded thereon.

As shown in FIG. 1, if there is a focus error during an information reproducing process, a focus error signal will be generated and fed from the pickup 3 through a current/voltage converter amplifier 4 to a focus error amplifier 5. An output signal from the focus error amplifier 5 is further amplified in a focus servo amplifier 6. An amplified focus servo signal is then fed to a focusing driver 7 which is provided to drive a focus actuator coil of the optical pickup 3 to perform a desired focus control. In this manner, a focus servo loop is thus formed so that a normal focus control may be carried out.

Referring again to FIG. 1, there are further provided a first focus offset signal generator 8, a second focus offset signal generator 9, and a controller 10 which is a MPU (microprocessor unit).

The first focus offset signal generator 8 is provided to be selectively connected to the focus error amplifier 5. In detail, the first focus offset signal generator 8 is set to produce a first focus offset signal that will cause jitters of main information (such as music information that may be called a first information) from a CD-R disc to be minimized. Similarly, the second focus offset signal generator 9 is also provided to be selectively connected to the focus error amplifier 5. In detail, the second focus offset signal generator 9 is set to produce a second focus offset signal that will enable a signal/noise ratio of pregroove wobble signal (that may be called a second information) to be maximized. The MPU 10 is provided to selectively apply either the offset signal from the generator 8 or the offset signal from the generator 9 to the focus error amplifier 5 in order that information recorded on the CD-R disc may be read out under an optimized condition.

In principle, with respect to an optical disc player, the the beam spot of a laser beam is required to be small in size so that it is possible to properly read out information recorded by virtue of small signal pits. However, in practice, since there is a limitation in the size of a beam spot (i.e., the size of a beam spot is difficult to be made as small as is required), and since a signal/noise ratio will vary depending on a light receiving amount, there has been suggested that a beam spot be changed in shape in accordance with actual information pits so as to perform a desired information reproduction.

Generally, main information signals are recorded by forming numerous information pits on many grooves on an optical disc (also including a phase change recording medium), with these information pits arranged and varying along the track direction. On the other hand, wobble signals of the pregrooves are recorded thereon by forming track waviness. Thus, it would be useful to employ a method where a beam spot is changed in shape in accordance with an actual state of recorded information so as to achieve a desired information reproduction.

In fact, a beam spot usually has an elliptical shape due to aberrations of optical parts and properties of a laser beam source, but such an elliptical shape of a beam spot will change a little depending on an extent of defocusing. In order to reproduce main information recorded as pits with a high precision, it is expected that a beam spot having a narrow width in track direction may produce only a minimum signal jitter. On the other hand, when wobble signals of pregrooves formed on a CD-R disc are to be reproduced, since it is necessary to detect signal variations in the direction orthogonal to track direction, it is expected that a beam spot having a narrow width in the direction orthogonal to the track direction may perform a reproduction with a high S/N (signal/noise) ratio.

When it is necessary to perform an operation such as search, pause, and recording/reproducing on PMA (program memory area), it is required that wobble signals of the pregrooves be reproduced first. This is because there is not yet a time data of the main information recorded on a disc, only a time data of the wobble signal can be used to control some operations such as search, pause and PMA recording/reproducing.

At this time, according to the present invention, the MPU 10 will perform a change-over operation such that the second focus offset signal from the second focus offset signal generator 9 will be fed to the focus error amplifier 5. In the focus error amplifier 5, the second focus offset signal is added into an focus error signal fed through the current/voltage converter amplifier 4, so that a desired focus control can be performed on the base of a summed signal (two signals added together).

As a result, due to a defocusing action, a beam spot will change into an elliptical shape 24 (FIG. 2) having a shorter axis in a track direction, thus it is possible to perform desired reproduction with a high S/N ratio.

On the other hand, when it is necessary to at first record or reproduce main information from a disc, the MPU 10 will perform a change-over operation such that the first focus offset signal from the first focus offset signal generator 8 will be fed to the focus error amplifier 5. In the focus error amplifier 5, the first focus offset signal is added into a focus error signal fed through the current/voltage converter amplifier 4, so that a desired focus control can be performed on the base of a summed signal (two signals added together).

As a result, due to a defocusing action, a beam spot will change into an elliptical shape 26 (FIG. 2) having a shorter axis in track direction, so that it is permitted to perform desired reproduction with a minimized signal jitter.

Further, it is also possible to provide a disc type discriminating means (not shown) for determining the kind of an optical disc and to change the shape of a beam spot in accordance with a discriminating result from the discriminating means. For instance, the discriminating means operates to determine whether a disc is a CD disc (may be called a first disc in which information has been recorded by forming information pits). If the discriminating result indicates that the disc is a CD disc, such a discriminating result will be fed to the MPU 10. The MPU 10 then performs a change-over operation such that the first focus offset signal generator 8 will be selected, thereby obtaining a beam spot having an elliptical shape 26 (FIG. 2) with its shorter axis arranged in a direction of a track direction. On the other hand, if the discriminating result indicates that the disc is a CD-R disc (may be called a second disc, in most cases associated with a CD-R disc, it is necessary to read out the wobble signal), such a discriminating result will also be fed to the MPU 10. The MPU 10 then performs a change-over operation such that the second focus offset signal generator 9 will be selected, thereby obtaining a beam spot having an elliptical shape 24 (FIG. 2) with its shorter axis arranged in a direction orthogonal to the track direction. In this way, information reproduction may be performed satisfactorily no matter whether an optical disc is a CD or a CD-R.

The operation of the optical pickup controlling system according to the present invention will be described in more detail with reference to FIG. 2.

Figure 2:
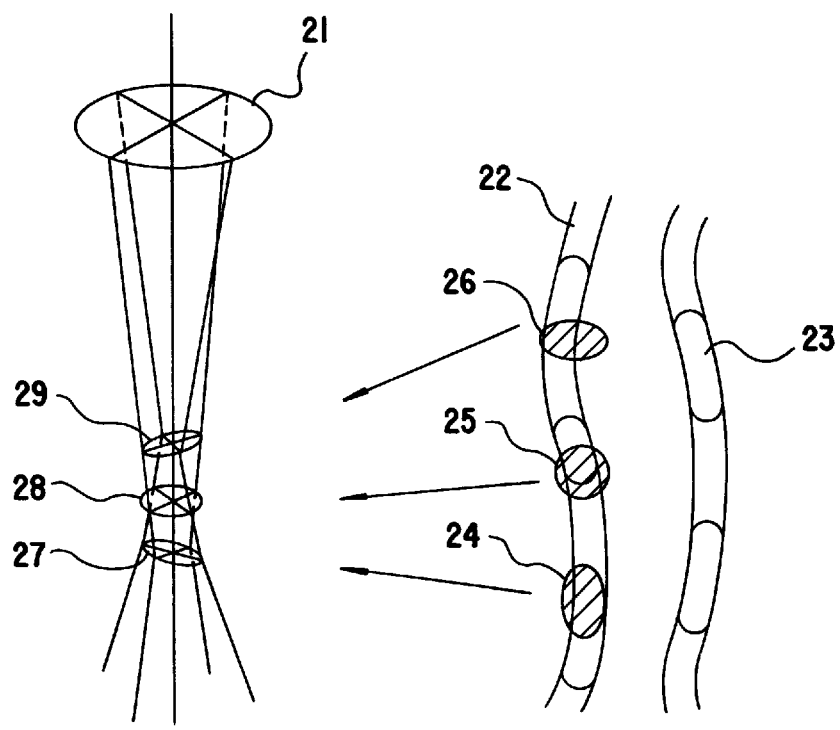
FIG. 2 is an explanatory view showing several changes in the shape of a laser beam spot.
Figure 3:
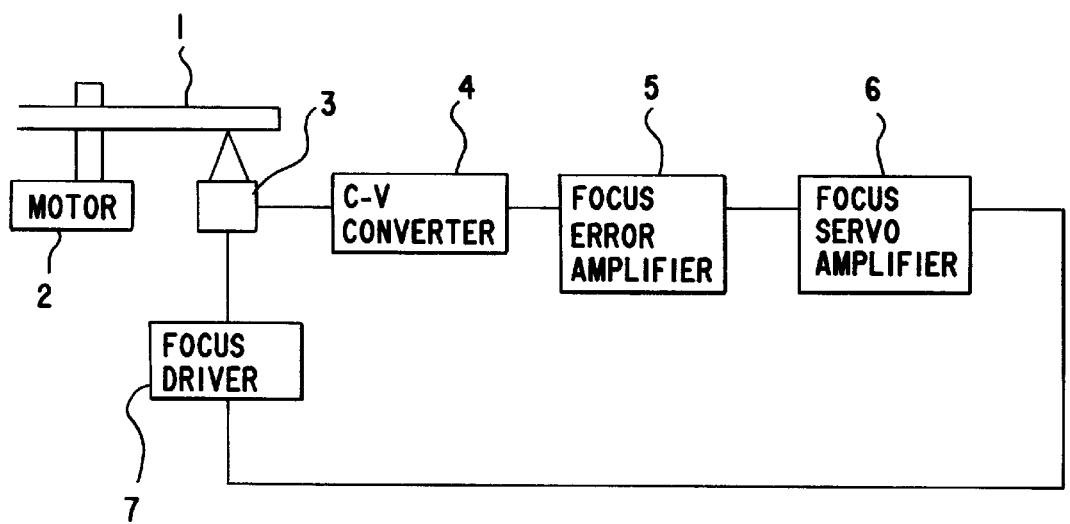
FIG. 3 is a block diagram showing a conventional optical pickup controlling system.

Referring to FIG. 2, a laser beam is converged through an objective lens 21. The converged laser beam is directed so as to irradiate a pregroove 22 with any one of beam spots 24–26. The beam spots 24–26, if indicated in a perspective view, may be shown as respective beam spots 27–29.

Referring again to FIG. 2, according to the present invention, when main information (or called first information) in the form of pits 23 is to be read out, a laser beam having a beam spot 26 is utilized. On the other hand, when wobble signal (or called second information) is to be read out, a laser beam having a beam spot 24 is employed. In FIG. 2, a laser beam having a beam spot 25 which has not been compressed in either track direction or a direction orthogonal to track direction, had been used in prior art.

Although in the above embodiment, it has been described that the shape of a laser beam spot may be changed by changing an extent of focus offset, it is also possible to change the shape of such a laser beam spot by disposing an optical element (capable of changing the shape of a laser beam spot) between a laser beam source and an objective lens. For instance, it is possible to selectively insert an auxiliary lens between a laser beam source and an objective lens to change the shape of a laser beam spot into a desired shape.

As can be understood from the above description, with the use of the optical pickup controlling system according to the present invention, since it is possible to select a best suitable shape of a laser beam spot for reading out information from an optical disc, it can be expected to perform information reproduction under an optimized condition, thereby enabling to reproduce main information such as video and audio data with a minimized generation of jitter signal, and reproduce wobble signal of pregrooves with a maximized S/N (signal/noise) ratio.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical pickup controlling system for an optical disc player, wherein said optical disc player is adapted to direct a laser beam on to an optical disc which contains a first information recorded thereon in terms of information pits formed on information tracks and a second information recorded thereon in terms of shapes of said information tracks, with said first information and said second information recorded on identical information tracks, comprising:

the laser beam has a shape of one of a first beam spot and a second beam spot, based on whether said first information or said second information is reproduced, the second beam spot is for reproducing said second information, and the first beam spot for reproducing or recording said first information, said second beam spot is narrower in a direction orthogonal to an information track direction than the first beam spot.

2. An optical pickup controlling system for an optical disc player, wherein said optical disc player is adapted to direct a laser beam on to an optical disc which contains a first information recorded thereon in terms of information pits formed on information tracks and a second information recorded thereon in terms of shapes of said information tracks, with said first information and said second information recorded on identical information tracks, comprising:

the laser beam has a shape of one of a first beam spot and a second beam spot, based on whether said first information or said second information is reproduced, the second beam spot is for reproducing said second information, the first beam spot is for reproducing said first information, said first beam spot is narrower in an information track direction than the second beam spot.

3. An optical pickup controlling system according to claim 1 or 2, wherein the first beam spot is in an elliptical shape having its shorter axis arranged in information track direction, the second beam spot is in another elliptical shape having its shorter axis arranged in a direction orthogonal to information track direction.

4. An optical pickup controlling system for an optical disc player, wherein said optical disc player is adapted to direct a laser beam on to a first optical disc which contains information recorded thereon in terms of information pits formed on information tracks, or a second optical disc which contains information recorded thereon in terms of shapes of information tracks, comprising:

the laser beam has a shape of one of a first beam spot and a second beam spot, based on whether said first optical disc or said second optical disc is reproduced, said second beam spot is for recording or reproducing said second optical disc, and said first beam spot is for reproducing said first optical disc, said second beam spot is narrower in a direction orthogonal to an information track direction than said first beam spot.

5. An optical pickup controlling system for an optical disc player, wherein said optical disk player is adapted to direct a laser beam on to a first optical disc which contains information recorded thereon in terms of information pits formed on information tracks, or a second optical disc which contains information recorded thereon in terms of shapes of information tracks, comprising:

the laser beam has a shape of one of a first beam spot and a second beam spot, based on whether the first optical disc or the second optical disc is reproduced, the second beam spot is for recording or reproducing the second optical disc, the first beam spot is for reproducing the first optical disc, the first beam spot is narrower in an information track direction than the second beam spot.

6. An optical pickup controlling system according to claim 4 or 5, wherein the first beam spot is in an elliptical shape having its shorter axis arranged in information track direction, the second beam spot is in another elliptical shape having its shorter axis arranged in a direction orthogonal to information track direction.

7. An optical pickup controlling system according to any one of claims 1, 2, 4, and 5 comprising:

a focus error signal generator for producing a focus error signal;

a first focus offset signal generator for producing a first focus offset signal;

a second focus offset signal generator for producing a second focus offset signal;

wherein the first focus offset signal is added to the focus error signal to obtain a laser beam having the first beam spot;

wherein the second focus offset signal is added to the focus error signal to obtain a laser beam having the second beam spot.

8. An optical pickup controlling system according to any one of claims 1, 2, 4 and 5 comprising:

a focus error signal generator for producing a focus error signal;

a first focus offset signal generator for producing a first focus offset signal;

a second focus offset signal generator for producing a second focus offset signal;

a controller for selectively adding the first focus offset signal or the second focus offset signal to the focus error signal;

wherein the first focus offset signal is added to the focus error signal to obtain a laser beam having the first beam spot;

wherein the second focus offset signal is added to the focus error signal to obtain a laser beam having the second beam spot.

9. An optical pickup controlling system according to any one of claims 4 and 5 comprising:

a focus error signal generator for producing a focus error signal;

a first focus offset signal generator for producing a first focus offset signal;

a second focus offset signal generator for producing a second focus offset signal;

a disc type discriminating means for determining a disc to be played is a first optical disc or a second optical disc;

a controller for adding the first focus offset signal to the focus error signal when an optical disc to be played is the first optical disc, and for adding the second offset signal to the focus error signal when an optical disc to be played is the second optical disc;

wherein the first focus offset signal is added to the focus error signal to obtain a laser beam having the first beam spot;

wherein the second focus offset signal is added to the focus error signal to obtain a laser beam having the second beam spot.

* * * * *